May 30, 1961    J. FREEDMAN    2,985,957
CUTTING TOOLS AND DETACHABLE WORK-HOLDERS THEREFOR
Original Filed Jan. 15, 1952
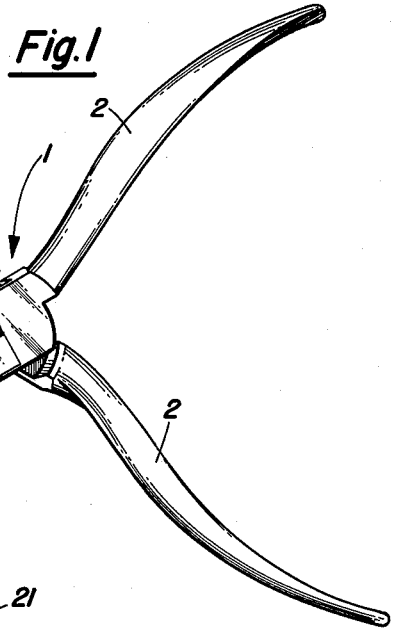
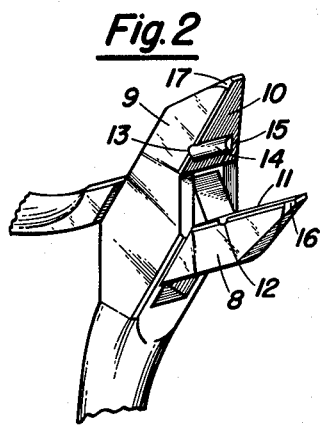
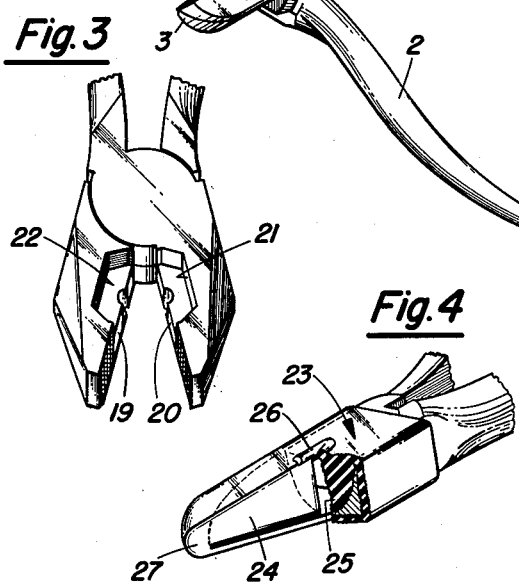
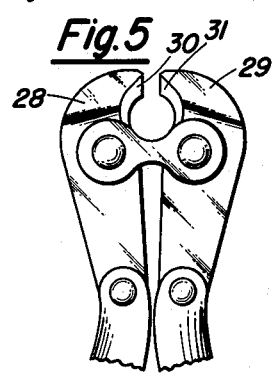
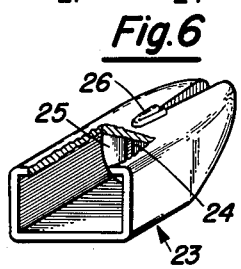
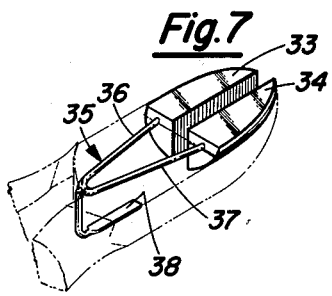
INVENTOR.
Jesse Freedman
BY
Attorneys United States Patent Office 2,985,957
Patented May 30, 1961

2,985,957
CUTTING TOOLS AND DETACHABLE
WORK-HOLDERS THEREFOR

Jesse Freedman, 208 Santa Clara Ave., Alameda, Calif.

Original application Jan. 15, 1952, Ser. No. 266,581. Divided and this application Oct. 6, 1955, Ser. No. 539,037

3 Claims. (Cl. 30—124)

(Granted under Title 35, U.S. Code (1952), sec. 266)

The invention described herein may be manufactured and used by or for the Government of the United States of America for governmental purposes without the payment of any royalties thereon or therefor.

This application constitutes a division of my co-pending application Ser. No. 266,581, filed January 15, 1952, now abandoned.

This invention relates to tools and more particularly to cutting tools having means for gripping a workpiece while being cut. The primary object of this invention is to provide a simple and effective cutting tool adapted to hold a workpiece being cut and to provide means for accomplishing this function. Another object of this invention is to provide a cutting tool having the region of its cutting jaws insulated and to provide means for effecting this insulation.

The features of the invention can perhaps best be pointed out in relation to a wire cutter of the type commonly known as diagonals or diagonal cutters. It has long been known that when wire, particularly stiff, springy wire, is cut by such a tool, the cut piece frequently flies away from the tool with considerable force, not only inflicting possible injury on the operator but also possibly lodging in an inconvenient place. Prior art attempts to eliminate this difficulty are exemplified in U.S. Patent No. 1,862,556, in which there is shown screwed to one jaw of such a wire cutter a fixed gripping element and to the other jaw pivoted a cooperating gripping element urged into abutment with the fixed gripping element by means of a spring. The object of this arrangement is to grip a wire or workpiece being cut to hold it during the cutting process and thereafter. However, such prior art devices suffered from several deficiencies that have made their use impractical. Applying such gripping elements to a standard cutter already in use requires drawing the temper of the jaw portion so that holes can be drilled in it for screws, drilling the holes, re-tempering the jaws and subsequently attaching the gripping elements. This is an expensive, time-consuming, inconvenient procedure. Furthermore, it results in the addition of parts protruding irregularly from the surface of the tool and subject to disarrangement when the tool is tossed about in tool boxes, for example, and possibly hindering the approach of a tool to a workpiece or a wire to be cut in confined spaces. Other prior art devices have required redesign of standard tools to enable the attachment of shields or similar elements for the purposes of the invention. This, again, involves considerable unwarranted expense and renders the suggestions impractical. According to the present invention, it is contemplated to apply to a cutting tool gripping elements for gripping a workpiece to be cut without in any way requiring redesign of a standard tool or involving any extensive amount of labor in applying the gripping elements or treating a standard finished tool in any manner so as to adversely affect the temper thereof or providing complicated parts that may undesirably protrude or be subject to getting out of order. A principal feature of the invention involves the application, therefore, of gripping elements to a cutting tool by a process involving no substantial tampering with or alteration of the essential structure of a finished tool such as by drilling holes in it or drawing the temper of its jaws. The invention, then, involves the attachment of gripping elements in the following several ways. If the gripping elements involve metal structure, they are applied either by spot welding, soldering or some other similar process involving temperatures insufficient to disturb the temper of the cutting tool or by frictional attachment as by clamping or clipping onto the tool. If the gripping elements involve materials other than metal, they are applied by frictional attachment as by clipping onto the tool or they are applied as a glove simply slipping onto the tool or they are applied by cementing, vulcanizing or otherwise adhering to the tool under a process involving no temperature sufficiently high to disturb the temper of the jaws of the tool.

Another important feature of the invention is the use of gripping elements of yieldable, resilient material which can often be conveniently molded to rest within the throat of the cutting jaws of a tool, thus in no way disadvantageously altering the general contour of the tool or its dimensions so as to impair its ability to operate in confined spaces. Another important feature of the invention involves the provision of insulation substantially covering the jaw region of a cutting tool for insulating the tool electrically or thermally from adjacent structures permitting, for example, the severing of a live electric wire immediately adjacent another such wire without danger of contact being made between the two wires through opposite surfaces of the jaw of a cutting tool.

Other objects and many of the attendant advantages of this invention will be readily appreciated as the same becomes better understood by reference to the following detailed description when considered in connection with the accompanying drawings wherein:

Fig. 1 is a perspective view of a wire cutter known as diagonals embodying the gripping elements of this invention;

Fig. 2 is a view of a portion of a wire cutter similar to that of Fig. 1 but provided with facilities for stripping wire and also provided with slightly enlarged gripping elements to prevent any accidental avoidance of gripping;

Fig. 3 is a perspective view of a portion of a pair of linemen's pliers including facilities for wire stripping;

Fig. 4 is a view of a portion of a pair of diagonal cutters showing the gripping elements of the invention and the insulation feature of the invention combined together in the form of a glove-like member slipped onto the jaw region of the cutter, one jaw and its accompanying gripping element and insulation being shown in cross section;

Fig. 5 is a view of a pair of end nippers having the gripping elements of the invention applied to the throat of the nippers;

Fig. 6 is a perspective view partially in cross section of the glove-like member of Fig. 4; and Fig. 7 is a view of the gripping elements of the invention shown as embodied in a clip applied to a pair of diagonal cutters, which are illustrated in phantom.

As shown in Fig. 1, the numeral 1 represents generally a wire cutter of the standard type known as diagonals having handles 2 and cutting jaws 3 and 4. The gripping elements adapted to hold or retain a workpiece while it is being cut by the jaws 3 and 4 are indicated by numerals 5 and 6 in probably their simplest form. The gripping elements are made of an elastomer such as rubber or a rubber substitute vulcanized in place in the throat of the jaws.

An easy, if crude, method of applying the gripping elements to the jaws of the tool is simply to clean and slightly roughen by sandblasting or the like the throat of the jaws, then coat them with rubber cement which is allowed to become tacky, and then close the jaws against one another and press into the throat of the jaws against the tacky rubber cement a gob of uncured rubber or other elastomer. The gob of rubber is bound in place by tightly wrapping a piece of tape around the jaws and the tool is then placed in an autoclave to vulcanize the rubber or other elastomer in place. After removing the tool from the autoclave, the tape is removed from the tool and a slit is made in the gripping material with a fine, sharp instrument such as a razor blade along the line of separation between the jaws, thus allowing the jaws of the tool to separate in the usual manner. The excess portions of the gob of gripping material are buffed off on a buffing wheel or the like and the tool is ready for use. For mass production, particularly of more finely finished and efficiently produced tools, a multiple-position mold can be used adapted to receive and hold a number of similar tools in place during the vulcanizing operation.

In using the tool, it is employed in the ordinary manner, taking care that it is so oriented relative to the wire or other workpiece to be cut that that portion of the workpiece which it is desired to retain extends into the throat of the cutters. Then, as the jaws are closed to sever the workpiece, the portion extending into the throat is gripped and held by the elements 5 and 6 during and after severing until the jaws are opened.

In Fig. 2, a pair of wire cutters similar to that in Fig. 1 is shown having jaws 8 and 9 provided with gripping elements 10 and 11. The jaws of this cutter are notched in a well-known manner at 12 and 13 to facilitate stripping insulation from wire. In order to allow the stripping notch to operate, a recess is formed in each of the gripping elements as shown at 14 adapted to receive the insulation on wire to be stripped by the tool. Were these recesses not formed in the gripping elements, the extra bulk of the insulation between the gripping elements would prevent the jaws of the tool from closing sufficiently to effectively strip the wire. As a safety precaution, the recesses 14 do not extend entirely through the gripping elements but a thin section 15 is left un-recessed. Thus if the cutter is used to cut ordinary bare wire, there is still sufficient gripping element material adjacent every region of the cutting jaws to insure gripping the wire and prevent its being expelled from the cutter. As an added safety feature in this embodiment, the gripping elements are formed to provide tips or extensions 16 and 17 protruding sufficiently beyond the tips of the jaws 8 and 9 so that it is impossible to insert a piece of wire to be cut by the tool, at however acute an angle relative to the line of contact of the jaws, without being gripped adequately by the gripping elements.

Fig. 3 shows a linemen's pliers in which gripping elements 19 and 20 have been vulcanized in the throat of the tool. The entire throat is not filled with the rubber-like material since the tool is customarily used for turning nuts or bolts on electrical apparatus by employing the straight sides 21 and 22 of the throat recess as the jaws of a pliers or wrench. By only partially filling the throat with gripping element material sufficient depth is left to the faces 21 and 22 to insure adequate gripping of a nut or bolt while at the same time there is an adequate depth to the gripping elements to insure gripping pieces of wire or other material being cut.

Fig. 4 shows a pair of diagonal cutters similar to those in Figs. 1 and 2 to which has been applied a glove-like element 23 to provide not only gripping elements 24 and 25 similar to those in Figs. 1 and 2 but also complete covering of the jaw region of the tool to insulate this jaw region. The glove can be formed in a most elementary way by simply taking the tool and, taking care not to roughen it or apply any cement that might cause adherence, molding a gob of elastomer gripping element material around the jaw region and vulcanizing the material in place in an autoclave. After vulcanization a thin blade, such as a razor blade or the like, is used to slit the elastomer along the line of contact of the cutting jaws of the tool separating the glove-like member into two finger portions. The material, not having adhered to the metal of the tool, can be slipped on and off the cutters at will. Removed from the cutter, the glove-like member is shown in Fig. 6. Preferably, for mass production and a more neatly finished product, the glove is formed in a mold and includes a bead 26 formed at the apex of the slit of the fingers of the glove to prevent undesirable tearing of the material at this point. While the structure in Figs. 4 and 6 has been described as a glove, it is obvious that it can be made as a permanent part of the cutting tool vulcanized or cemented in place and thus provide permanent insulation of the jaws. In operation of the tool this means that, for example, one live wire adjacent several others could be cut without danger of shorting to the others through the accidental contact of the others with the outer portions of the cutting jaws of the tool. An additional, frequently desirable, feature of this type of construction is that it provides gripping elements on both sides of the plane of motion of the cutting jaws, thus enabling the tool to grip both of the severed sections of a workpiece being cut. A similar result could, of course, be obtained by moving additional gripping elements in the tool of Fig. 2, for example, on the surfaces of the jaws 8 and 9 visible in Fig. 2, that is, opposite the throat surface of the jaws. This, however, impairs access of the tool to confined spaces and such construction would therefore be used only when the particular cutting operation is suited to it and requires gripping of both of the severed sections of the workpiece. While the glove shown in Figs. 4 and 6 is made entirely of soft resilient material, it need not necessarily be thus constructed. The glove can be partially rigid, being made of hard rubber or the like, so long as the rigid parts are joined together by yieldable material at the points where stretching must occur. Likewise, when this glove-like form is attached as a permanent coating to a tool, the portion of the coating destined to serve as insulation only can be relatively hard so long as the gripping elements and the regions of the coating subject to stretching are made of soft, resilient material. It may be noted that although the glove form of Figs. 4 and 6 includes a tip portion such as 27 completely covering the ends of the cutting jaws of the tool, the glove coating can, if desired, be formed with the tips of the fingers cut off exposing the ends of the cutting tool, thus facilitating use of the ends of the tool in confined spaces. Under such circumstances, the glove form really degenerates into a sleeve and such a sleeve type would be particularly useful in long-nosed wire cutting pliers where the sleeve, which includes the gripping elements, would surround only the wire cutting portion of the tool and leave the long-nose tips free for their usual use. As used hereinafter, the term "glove-like member" is intended to comprehend both the type of glove illustrated and the sleeve form with the tips cut off the fingers.

In all cases a principal feature of the invention is apparent; namely, that the gripping elements are attached to the cutting tool in some manner that requires no substantial alteration of the shape or form of a standard cutting tool nor any alteration of its temper by high temperatures. In this aspect, the invention comprehends a broad concept that can be envisioned as embodied as an improvement on the construction shown, for example, in U.S. Patent No. 1,862,556. The improvement as applied to the structure of that patent comprises the elimination of the time-consuming and complicated process of screwing gripping elements onto a tool, necessarily involving annealing and tempering, and substituting therefor a method of attachment requiring no such structural changes in the tool. According to the teaching of the present invention suggested methods are spot welding or cementing or the like of the metal gripping elements onto the cutter or forming the gripping elements as a clip to be frictionally mounted on the cutting tool.

In Fig. 5 is shown an end nippers embodying the gripping elements of the invention. In the throat of the jaws 28 and 29 are provided gripping elements 30 and 31 in a manner similar to those of Figs. 1, 2 and 3.

Fig. 7 shows the gripping elements 33 and 34 embodied in a clip 35 which can be simply clipped onto a cutting tool, illustrated in phantom in this figure as a pair of diagonals. Preferably, the elements 33 and 34 are preformed in a mold and vulcanized in place onto the resilient arms 36 and 37 of the clip. These arms are pre-stressed to tend to spring apart from each other, holding the gripping elements 33 and 34 against the jaws of the cutting tool. Similarly, pre-stressing and the resilience of the clip material urge the arms 36 and 37 toward the under portion 38 of the clip and thus keep the clip firmly in place on the tool.

While all of the foregoing embodiments have been described in terms of gripping elements made of an elastomer or rubber-like substance, it is obvious that many other materials would be satisfactory such as a wide variety of plastics, and, in fact, even certain cloth-like materials such as felt. It is preferable that the material chosen be resistant to deterioration from oils or other agents likely to be encountered in operation of the tools. The primary requirement is that the material be sufficiently resilient to be able to grip the wire or other workpiece being cut without being permanently deformed sufficiently to prevent repetition of this operation. It should be noted that although the illustrated embodiments all show two opposed resilient gripping elements, it is apparent that one such resilient or deformable element would be sufficient reacting against a relatively non-deformable or rigid gripping element. Thus, for example, one gripping element could be made of metal or fiber or hard rubber while the other is made of soft rubber or elastic rubber. It may further be noted that in all the illustrated embodiments, for simplicity, the gripping elements have been shown as symmetrically placed in the throat of the tool but for special applications it may be found desirable to form the gripping elements to special shapes to avoid damage to some irregular projecting part of a workpiece being cut. It should also be observed that in the particular preferred embodiments shown in the drawing, one aspect of the invention appears in common: the gripping element is stationary with respect to the jaw. That is, it does not move bodily relative to the jaw but merely deforms. This makes for a simplified construction, avoiding the necessity of complicated and relatively expensive, bulky, pivoted arrangements.

Obviously many modifications and variations of the present invention are possible in the light of the above teachings. It is therefore to be understood that within the scope of the appended claims, the invention may be practiced otherwise than as specifically described.

For convenience in selecting descriptive language for use in the claims, the following definitions are included. The jaw portions of the cutting tools shown in the drawings are those portions of the tool other than the handles. The portions of the jaws extending away from the handles beyond the pivot are designated as the distal or free portions of the jaws. The distal or free ends of the jaws are exemplified by the regions in Fig. 1 located at the end of the lead lines beginning at numerals 3 and 4; similarly, the distal or free ends of the jaws in Fig. 2 are the regions lying at the end of the lead lines beginning at numerals 16 and 17. The portions of the jaws closer to the pivot and opposite to the free ends are called the proximal portions of the jaws. The glove-like article shown in Fig. 6 and Fig. 4 includes two sheath portions, corresponding to the finger sheaths of an ordinary glove. The sheath portions are separate from one another but are joined at their proximal regions to a common body or sleeve portion lying at the tip of the arrowhead extending from the numeral 23. This common body or sleeve portion slips over the pivot region or proximal region of the jaws of the tool. As explained hereinbefore in the specification, the portions of the glove-like member constituting the sheaths do not necessarily fully enclose the free regions of the jaws. For example, in use with certain tools, it may be desirable to omit the tip or distal portion of the sheath shown at 27, for example, in Fig. 4; also the sheath, as shown in Fig. 4, has a slit in it along the line of the cutting edges of the jaws of the tool to enable the jaws to bear against each other.

What is claimed is:

1. For use with a cutting tool having a pair of cutting jaws, a workpiece-gripping device easily attachable to and detachable from said cutting tool; said device having separate gripping elements of yieldable resilient material; said device having a common normally stationary body portion; separate means extending from said body portion supporting each of said gripping elements for motion relative to each other and, when said device is applied to said cutting tool, for positioning each of said gripping elements adjacent, respectively, one of said cutting jaws for motion in unison with said respective cutting jaw relative to said other cutting jaw and its respective gripping element in unison with it.

2. The device of claim 1 wherein said device includes resilient means for holding said device snugly in engagement with said cutting tool.

3. In combination a cutting tool having pivoted jaws with cooperating cutting edges and hollowed-out portions, and an elastomer member applied to said cutting tool comprising a sleeve portion encircling the jaws in the region of the pivot and a pair of channel portions extending forwardly from the sleeve portion to enclose the outer surfaces of the jaw portions beyond the pivot, the channel portions each carrying filler portions positioned in the hollows of the jaws adjacent the cutting edges and functioning to grip a portion of an object which has been cut by the tool to prevent it from flying away from the tool.

References Cited in the file of this patent

UNITED STATES PATENTS

| | | |
|---|---|---|
| 646,633 | Wiseman | Apr. 3, 1900 |
| 1,533,535 | Audibert | Apr. 14, 1925 |
| 1,862,556 | Welhaven | June 14, 1932 |
| 2,302,810 | Steegmuller | Nov. 24, 1942 |
| 2,323,497 | Strout | July 6, 1943 |
| 2,594,684 | Rothe | Apr. 29, 1952 |
| 2,715,769 | Liscomb | Aug. 23, 1955 |